United States Patent
Hericourt et al.

(10) Patent No.: US 7,099,916 B1
(45) Date of Patent: Aug. 29, 2006

(54) SYSTEM AND METHOD FOR DOWNLOADING A VIRUS-FREE FILE CERTIFICATE FROM A FILE SERVER

(75) Inventors: Oliver Hericourt, Cagnes-sur-Mer (FR); Jean Francois Le Pennec, Nice (FR)

(73) Assignee: International Business Machines Corporation, Armonk, NY (US)

( * ) Notice: Subject to any disclaimer, the term of this patent is extended or adjusted under 35 U.S.C. 154(b) by 1115 days.

(21) Appl. No.: 09/656,896

(22) Filed: Sep. 7, 2000

(30) Foreign Application Priority Data

Jan. 6, 2000 (EP) .................................. 00480008

(51) Int. Cl.
*G06F 15/16* (2006.01)
(52) U.S. Cl. ...................................... 709/203; 713/188
(58) Field of Classification Search ................ 709/203, 709/217–219; 713/156, 191, 201, 155, 161, 713/168–170, 188, 200; 714/33, 38, 1, 25, 714/732; 726/22–24
See application file for complete search history.

(56) References Cited

U.S. PATENT DOCUMENTS 6,094,731 A * 7/2000 Waldin et al. ................. 714/38
6,892,303 B1 * 5/2005 Le Pennec et al. ......... 713/188

* cited by examiner

Primary Examiner—Andrew Caldwell
Assistant Examiner—Hieu Le
(74) Attorney, Agent, or Firm—Law Office of Charles W Peterson, Jr.; Louis P. Herzberg (57) ABSTRACT

The present invention relates to computer viruses and more particularly to a method and system for requesting a virus-free certificate associated with a file of a file server and downloading this virus-free file certificate or a file including this virus-free file certificate from the file server. The method, for use in a client system (100), comprises the steps of:

sending (401) a request to a file server for a virus-free certificate associated with a file to download from the file server, the request comprising one or a plurality of requirements (301 . . . 307) for the virus-free certificate;

downloading (403) the file and the associated virus-free certificate, the virus-free certificate comprising a file signature (207) for certifying that the file is declared virus-free by a virus-free certificate authority (102).

The method, for use in a file server (101), comprises the steps of:

receiving (401) a request from a client system for a virus-free certificate associated with a file to download to the client system, the request comprising one or a plurality of requirements (301 . . . 307) for the virus-free certificate;

downloading (403) the file and the associated virus-free certificate, the virus-free certificate comprising a file signature (207) for certifying that the file is declared virus-free by a virus-free certificate authority (102).

36 Claims, 4 Drawing Sheets

| | |
|---|---|
| (301) | Authorized / trusted issuers |
| (302) | Authorized antivirus programs |
| (303) | File types requiring Certificates |
| (304) | Virus-free Certificates types |
| (305) | VCA proxy |
| (306) | Default VCA |
| (307) | Download actions |

SYSTEM AND METHOD FOR DOWNLOADING A VIRUS-FREE FILE CERTIFICATE FROM A FILE SERVER

TECHNICAL FIELD

The present invention relates to computer viruses and more particularly to a method and system for requesting a virus-free certificate associated with a file of a file server and downloading this virus-free file certificate or a file including this virus-free file certificate from the file server.

BACKGROUND OF THE INVENTION

Among all computing and networking security issues, the most important cause of concern does not come from intrusions, but from the widespread proliferation of viruses. Viral infections represent the great majority of all security incidents.

Virus Protection

Virus protection for large organizations has become more and more complex and difficult because of:

the combined use of heterogeneous systems and practices, the widespread use of distributed or client/server systems, and the free exchange of data files via network sharing, e-mail, Internet . . .

Until recently, viral infections threatened only data residing on storage media, such as hard drives and floppy disks. However, with the emergence of macro viruses, the threat has spread to applications. Most organizations are not aware of this level of penetration and are not organized to manage and prevent virus attacks. An effective virus protection software must prevent infections rather than simply treating them after they have already occurred. Anti-virus solutions need a uniform plan, with a centralized control, automated virus signature updates, and support for multiple platforms, protocols, and file types.

Computer Viruses

A computer virus is any program created to reproduce itself. A virus reproduces itself by attaching itself to programs, files, or even to boot sectors of disks. A virus is activated when the infected file or disk is opened or accessed. Once a virus resides in a memory, it can attach itself to the next file or disk accessed, and so on. A virus may be designed to do harm. A virus may also have unintended consequences by overwriting important computer information and by causing costly inconveniences to users and network managers. There are four general types of computer virus:

File Viruses (including macro viruses), which are attached to files;

Boot sector Viruses in which the boot sectors of floppy or hard disks are infected;

Master Boot Record (MBR) Viruses which infect the disk master boot record; and

Multi-partite Viruses that are a combination of a file virus and a boot sector virus.

Virus Disguises

Viruses need to avoid detection in order to succeed in corrupting target computers. Simple viruses, with easily detectable signatures are giving way to more sophisticated virus types:

Polymorphic Viruses: they change their signature, or profile, each time they are activated so that a fixed signature filter will miss them.

Stealth Viruses: they attempt to hide their presence by intercepting interrupt services and by feeding back false information to anti-virus products and end users.

Encrypted Viruses: they are delivered within an encrypted file and are undetectable by a simple anti-virus.

Sources of Infection

Every improvement in network and communication technologies opens new avenues through which viruses can infect your system. Most of former viruses were boot sector viruses, in which the boot sectors of floppy or hard disks were infected.

Macro Viruses

As stated earlier, the creation of macro viruses has changed this environment dramatically. A macro virus is a set of instructions comprising powerful macro routines initially designed for word processing and spreadsheet applications. These macro languages enable a myriad of useful functions which can be imbedded into a document and which can be executed when the document is opened for view or use.

Internet

With the exploding development of the Internet, viruses have catastrophic possibilities. The Internet introduces two different virus threats.

The first threat is caused by the download of files comprising viruses when these files are browsed or transferred using for instance FTP (File Transfer Protocol) routines. Public shareware (shared software) and executable routines of all types, including formatted presentations, are a growing source of virus infection. Furthermore, new Internet virus threats are beginning to appear in the form of malicious JAVA and Active-X applets.

The second threat comes from electronic mail (e-mail). Most Internet e-mail systems provide a very rich capability to attach formatted documents to mail sent over the network. These e-mail messages can be broadcast to individuals or groups of individuals with the simple stroke of a key! Infected documents or files can flood a corporate network through gateways and mail servers. As networking, telecommunications, remote access, message systems supporting attachments of all kinds become more and more common, viruses will exploit these new electronic pathways to attack systems that were heretofore unreachable.

Groupware Complications

A third trend in networking also exacerbates the virus threat: the trend towards the deployment of Groupware applications such as Lotus Notes, Microsoft Exchange, Novell Groupwise, . . .

Since the active and repeated sharing of documents over the network is at the core of these applications, they represent a fertile ground for the deployment of macro viruses. A Groupware application not only acts as a repository for shared documents, but, due to its collaborative function, it simultaneously broadcasts files to associated work groups. The broadcast of files significantly multiplies the possibility of accidentally deploying mail infected by attached macro viruses and makes Groupware protection a high priority.

Symptoms of Virus Infection

Most viruses attempt to remain undetected as long as possible to extend their destructive influence. Therefore, most viruses do not produce any recognizable profile or signature that would allow to trap them by scanning the software. However, viruses perform actions that do not look like normal computer operations or user operations. These abnormal actions can be detected by intelligent anti-virus software. Fortunately, many viruses have telltale symptoms and may inadvertently give off signals that can alert users and virus protection software to their presence.

Some of these symptoms include:
  Increase in byte length of files,
  Alterations of a file's time stamp,
  Delayed program loading or activation,
  Reduced performance,
  Lower system resources, available memory, disk space,
  Bad sectors on floppies and hard drives,
  Strange or non-standard error messages,
  Non-standard screen activity, display fluctuations,
  Program inoperability (failing to execute),
  Incomplete or failed system boots, and
  Uninitiated drive writes.

Anti-Virus Software Overview

Detecting a Virus

Viruses are becoming increasingly sophisticated and, as such, can defeat simpler, single dimension software packages. To be effective, the anti-virus software must include special-purpose, distributed applications. Applications can detect viruses using five distinct methods:
  Signature Scanning: This method compares the content of files against a database of virus signatures. This method requires frequent updates of the database to ensure the identification of new and changing signatures.
  Integrity Checking: This method compares the profile of current files and disk areas against an archived snap shop of these same items. The detected differences may indicate the presence of a virus. Check summing is the most common type of integrity checking. Unfortunately, integrity checking is generally not effective against modern stealth viruses, so further detecting means are needed.
  Heuristic Analysis: An artificial intelligence monitors virus-like behavior, such as trapping certain interrupt services or attempting unlikely actions such as reformatting the hard disk.
  Polymorphic Analysis: Polymorphic viruses are difficult to detect because they constantly change their look, particularly when they are encrypted or when they use stealth techniques to hide their presence. A polymorphic analyzer will move any suspect file to a separate, protected, location in the computer and will execute it there to see if it exhibits any virus-like behavior.
  Macro Virus Analysis: A specifically designed anti-virus software detects macros in files and tests them before execution.

Archived and Compressed Files

In addition to the support of these five types of virus analysis, an effective anti-virus system must also be able to scan archived and compressed files. Zip (or Pkzip) and Microsoft Compression ate the most common tools for archiving and compressing a file. A virus can hide inside a compressed archive, and can remain dormant or unnoticed until the infected file is extracted and released into a system. The minimum for an efficient anti-virus system is to be able to scan most current types of archives to identify viruses stored within the files they contain.

Frequency of Database Signature Update

Finally, the ability of a virus software to prevent virus attacks is determined by its ability to maintain an updated virus signature database. Any anti-virus software must have an associated, easily accessible Web site, or some other online source of information, where regular virus database updates can be retrieved. Products that automate this update process by using an Internet connection to regularly collect new information have a clear advantage in this regard.

Real Time and Scheduled Virus Scanning

Most anti-virus software can perform a scan of a computer in order to detect and possibly treat the viruses found at that time. This process is called scanning. Scanning a computer for viruses can occur:
  at regular intervals under the control of a scheduler, or
  as an on-demand operation manually executed, or
  as an event-activated operation (usually in response to some recognizably "illegal" behavior by a potential virus).

In addition, viruses can be detected in real time, when they are received. This capability is important because if viruses can be detected when they attempt to enter within a system (computer, data repository, server . . . ), then it is possible to prevent them from corrupting other files. Oftentimes, a scheduled scan may occur after a virus has already entered within a computer and has corrupted other files. Obviously, the earlier a virus can be detected, the better.

To be truly useful, an anti-virus software must have the ability to perform all types of scans.

Certificate

A Certificate is a structure that contains a public value (i.e. a public key) associated with an identity. For instance, within a X.509 Certificate, the public key is bound to a "user's name". A third party (a Certificate Authority) attests that the public key belongs to the user. A X.509 Certificate is a very formal structure and comprises different elements:
  Subject: This is the "user's name" (the Subject can be any identity value).
  Issuer: This is the name of the third party that has issued/generated the certificate. This third party is the Certificate Authority (CA).
  Public Key Value: This is the public key of a public/private key pair. An associated field defines the public key algorithm that must be used, for instance a RSA, Diffie-Hellman or DSA public key.
  Validity: Two fields are used to define the period of validity (valid from date 1 and valid to date 2).
  Serial Number: This field provides a unique Certificate serial number for the issuer.
  Signature: The signature is an encrypted digest generated by the Certificate Authority (CA) for authenticating the whole certificate. The digest results from the hashing of the Certificate. The digest is encrypted using the CA private key. The encrypted digest which is the signature, "certifies" that the Subject is the "owner" of the public and private keys.

Certificate Verification

The Certificate needs to be verified to ensure that it is valid. This is a quite complex process. The verification by an end user of a Certificate comprises the checking of the following elements:
  Valid (or any) Subject and Issuer names are defined in the Certificate.

The Certificate is not expired (checking of the Validity period field).

The Certificate has not been revoked (this may be determined by obtaining a current Certificate Revocation List from the CA).

The signature on the Certificate is valid (the signature is not verified by using the Certificate's public key but by using the CA public key).

The method for validating the signature is quite simple, and comprises the steps of:

extracting the issuer's name (CA name) from the Certificate;

locating the issuer's Certificate (CA Certificate) or the issuer's public key (CA public key).

checking that the end user's Certificate signature was generated by the issuer (CA) using the issuer's public key (CA public key).

Certificates are generated by a Certificate Authority (CA). Two main methods can be used:

Centralized Generation: The private/public key pair is generated by the end user (defined in the subject field of the Certificate). The public key is directly provided by the end user to the CA software to create a Certificate. The Certificate can be provided to another end user via any suitable channel. The channel does not have to be secure because a Certificate is a self protecting structure (given the CA's signature).

Distributed Generation: The private/public key pair is generated by the end user. The end user requests the CA to build a Certificate including the end user public key. The public key is then sent to the CA for certification. If the request is valid then the CA returns a Certificate associating the user identity with the user public key to the end user.

Of course these two methods can be combined in any system, because trusted CA keys are generated by the Certificate Authority (CA).

OBJECTS OF THE INVENTION

Current anti-virus method are becoming more and more complex due to:

the number of viruses, the difficulty to find them, and the fact that their signature can change with time or environment.

Virus are coming from everywhere and especially from the Internet network. The time required to check a disk within a computer system, becomes more and more important. Furthermore, the checking of a disk involves the use of resources which may prevent the normal use of the computer system.

An object of the present invention is to improve current anti-virus methods and to provide a new method using file Certificates similar to X.509 Certificates used to authenticate an identity. A specific process associates a Certificate with a file to speed up and improve the anti-virus processing.

It is another object of the present invention to associate files with a Certificate in view of simplifying the anti-virus processing of said files.

It is another object of the present invention to validate a file against all known viruses. A Certificate is added to the file. The Certificate includes a signature made by a trusted server. This signature avoids local computer systems to check this file for all existing virus. The trusted server validates the file against all known viruses. This server can use one or several anti-virus checkers. In case of new virus only the certificates are changed or updated. The only process performed by the local computer system is to verify the file against the signature included in the Certificate.

It is another object of the present invention to drastically simplify the computing resources used for virus detection. Files on Web Servers are downloaded with their certificates suppressing the risk of virus. The full anti-virus is done once instead of being done locally on each computer system.

It is another object of the present invention to generate a virus-free Certificate associated with a file using a trusted Anti-virus Certificate Authentication Server.

It is another object of the present invention to configure a file transfer application on a client workstation for requesting and downloading from a file server a virus-free Certificate associated with a file or integrated within a file.

SUMMARY OF THE INVENTION

The present invention relates to computer viruses and more particularly to a method and system for requesting a virus-free Certificate associated with a file of a file server and for downloading this virus-free file Certificate or the file including this virus-free file Certificate from the file server. The virus-free Certificate is either already available on the file server and is then downloaded with the file or is requested to a virus-free Certificate Authority or Virus-free Certificate Authority Proxy. After the file is downloaded in the client workstation, the present method and system replace a complex virus detection by a simple file signature verification.

The method, for use in a client system, comprises the steps of:

sending a request to a file server for a virus-free certificate associated with a file to download from the file server, the request comprising one or a plurality of requirements for the virus-free certificate;

downloading the file and the associated virus-free certificate, the virus-free certificate comprising a file signature for certifying that the file is declared virus-free by a virus-free certificate authority.

The method, for use in a file server, comprises the steps of:

receiving a request from a client system for a virus-free certificate associated with a file to download to the client system, the request comprising one or a plurality of requirements for the virus-free certificate;

downloading the file and the associated virus-free certificate, the virus-free certificate comprising a file signature for certifying that the file is declared virus-free by a virus-free certificate authority.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

Introduction

Figure 1:
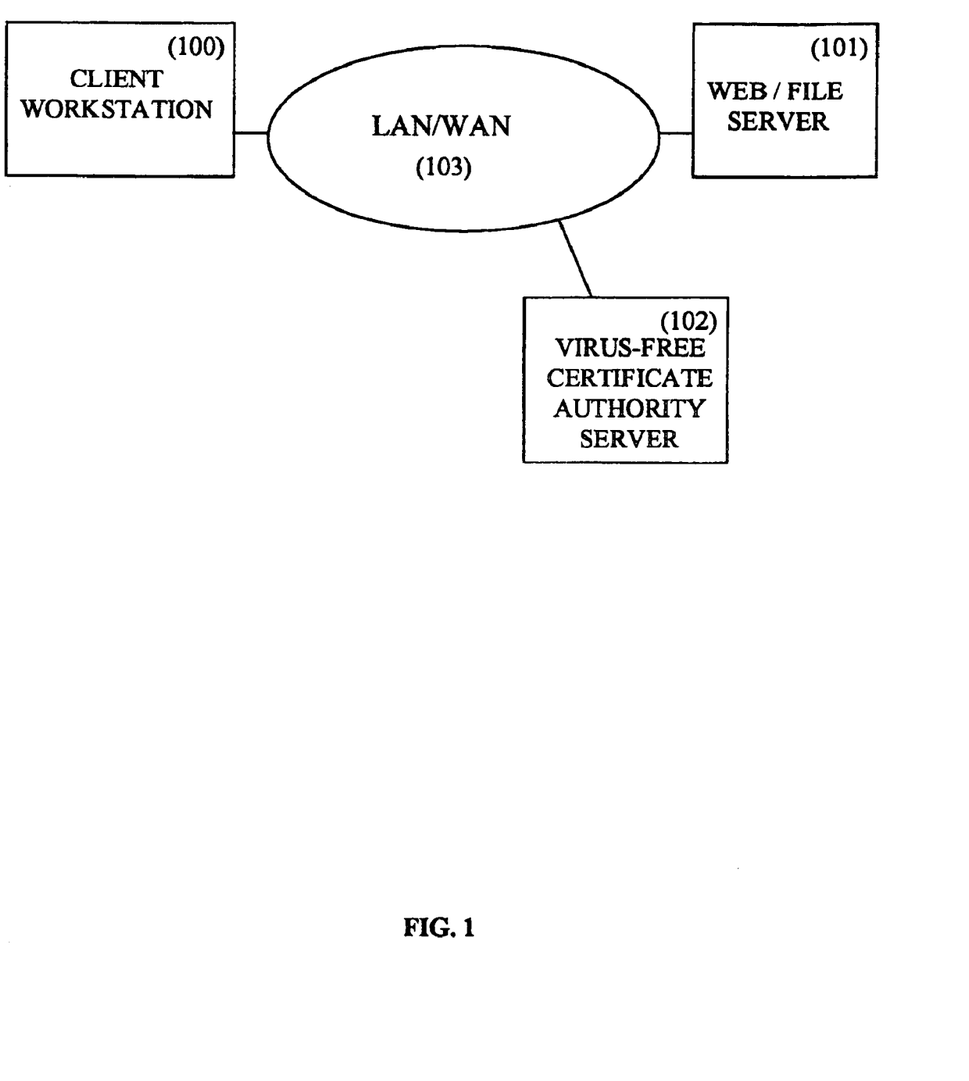
FIG. 1 describes the different entities involved in the anti-virus system according to the present invention.

FIG. 1 describes the different entities involved in the anti-virus system disclosed in the present invention. In most of the cases, the file that the Client Workstation (100) requires, is stored in a Web/File Server (101). A Certificate, stored in a directory within the Web/File Server (101), is associated with this file. The Certificate is provided by a Virus-Free Certificate Authority Server (102) after request. Said request is sent by the Web/File Server (101) to the Virus-Free Certificate Authority Server (102) through a LAN/WAN (Local Area Network/Wide Area Network) (103) which can include the Internet network. The Client Workstation (100) then downloads both file and associated virus-free Certificate in a directory and asks its anti-virus program to check the file. This checking process does not use any standard anti-virus program but is based on the previously downloaded virus-free Certificate. The only verification required in the Client Workstation for determining whether the file is virus-free or not, is the verification of the file signature comprised in the virus-free Certificate. If no virus-free Certificate is associated with the file, the Client Workstation (100) may request a Virus-free Certificate Authority (VCA)(102) to build the virus-free Certificate. The Client Workstation (100) may also request a Virus-free Certificate Authority Proxy to find a virus-free Certificate corresponding to this file and satisfying the Client request.

Figure 2:
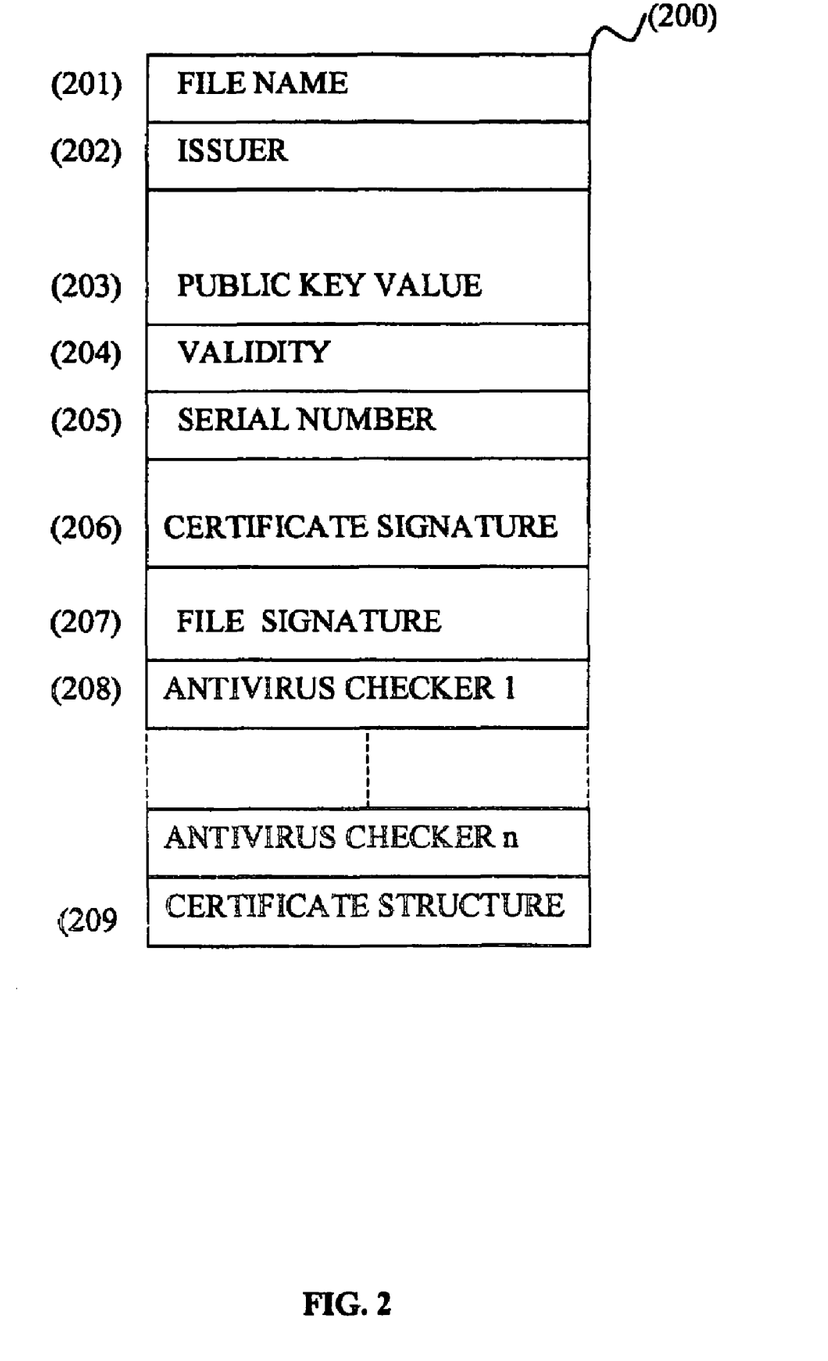
FIG. 2 describes the content of a virus-free Certificate according to the present invention.
Figure 3:
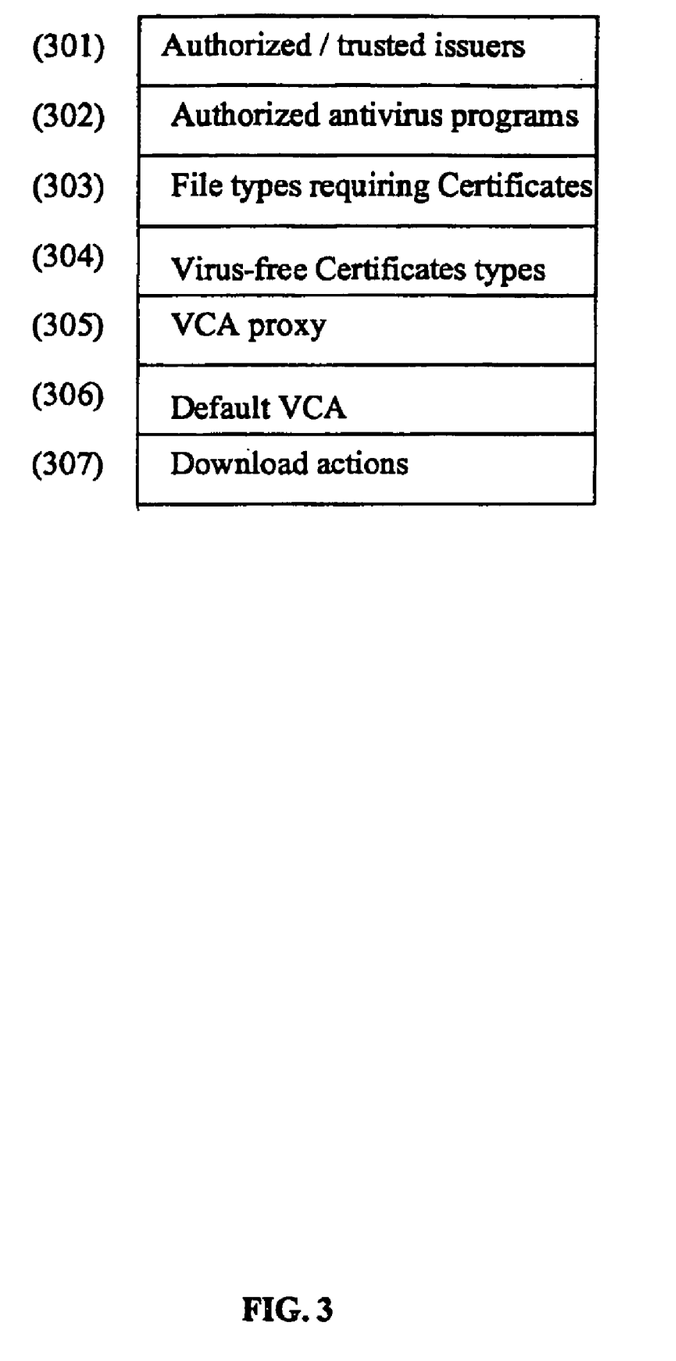
FIG. 3 describes some of the requirements for generating and handling a virus-free Certificate request according to the present invention.
Figure 4:
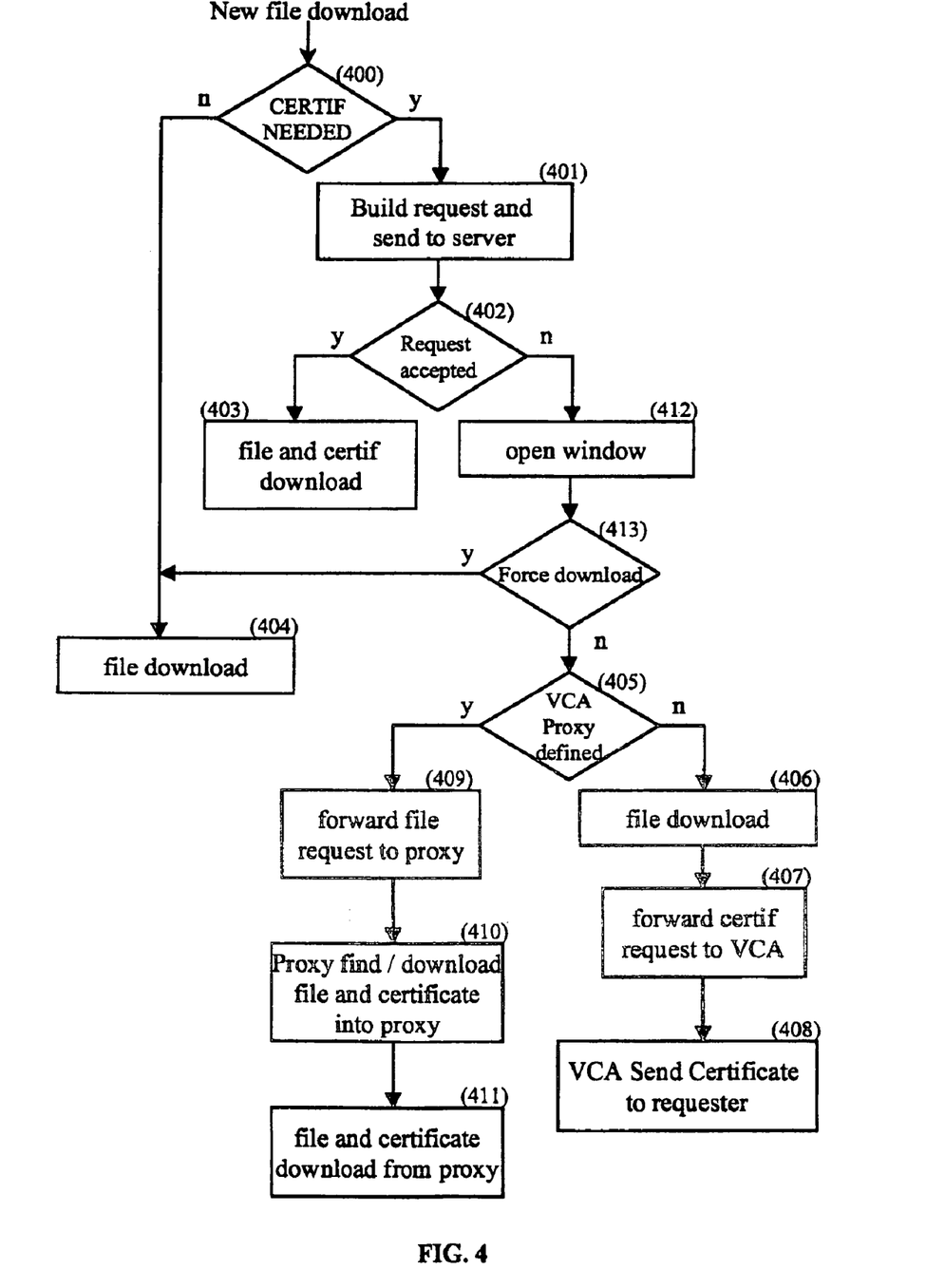
FIG. 4 is a flow chart of the method of requesting and downloading a virus-free Certificate from a file server to a client workstation according to the present invention.

All the above mentioned method will be better understood with respect to FIGS. 2, 3 and 4.

Virus-Free Certificate

FIG. 2 describes the content of a virus-free Certificate according to the present invention. The virus-free Certificate reuses the standard X.509 certificate format. It contains the signature of the file and therefore is bound to this file. The main difference between a X.509 Certificate and the virus-free Certificate is that the virus-free Certificate comprises:
 an anti-virus name and level;
 a signature of the file.

The virus-free Certificate (200) includes the following fields:
 File name (201): This is the "name" of the file protected that the virus-free Certificate protects.
 Issuer (202): This is the "name" of the third party that issued/generated the virus-free Certificate. This third party is the Certificate Authority (CA).
 Public Key Value (203): This is the public key of a public/private key pair. An associated field defines the public key algorithm that must be used to check the file signature, for instance a RSA, Diffie-Hellman or DSA public key. The public key is provided by the VCA which uses the corresponding private key to build the signature of files. So the same couple private/public key may be used to build several certificates from the same issuer. This public key provided within the certificate is preferably used instead of the Certificate Authority public key which is used to validate only the present Certificate signature and not the file signature. The main reason for adding a public key within the virus-free certificate to decrypt the integrated signature is that the VCA public key is generally longer and more complex to use for encryption and decryption. Validity of keys may also differ between the VCA public and the virus-free certificate public key. Anyway, as the certificate is signed by the VCA, the use of the virus-free certificate public key is secure.
 Validity (204): Two fields are used to define the period of validity (valid from date 1 and valid to date 2).
 Serial Number (205): This field provides a unique virus-free Certificate serial number for the issuer.
 Certificate Signature (206): The certificate signature is an encrypted digest generated by the Virus-free Certificate Authority (VCA) for authenticating the whole Certificate. The digest results from the hashing of the virus-free Certificate. The digest is encrypted using the CA private key. The certificate signature results from the encrypted digest and "certifies" that the file signature is encrypted by the private key associated with the virus-free certificate public key (203). The VCA public key is different from the virus-free certificate public key and is either preloaded in the web browser or given by a trusted entity. The VCA public key is used to retrieve the original hashing of the full certificate. The Virus-free Certificate Authority (VCA) can use the same set of virus-free certificate private/public keys (203) for all the files generated during a given period of time so the cross-checking of the issuer authentication can be easily performed time to time, when a new set of keys are used. Once the virus-free certificate public key for a issuer is validated it can be reused for several files certified by the same issuer which reduce the number of virus-free certificate public keys to store.
 File Signature (207): The File Signature is verified using the public key value given in the virus-free Certificate
 Anti-virus Checker (208): This field gives an indication of how the virus-free Certificate has verified that the file was virus-free. The Anti-virus Checker comprises the name and the level of the anti-virus program. Several anti-virus programs and levels may be appended to reinforce the efficiency of the anti-virus detection.
 Certificate Structure (209): This field describes the size and the content of the virus-free Certificate fields. The number or anti-virus program is defined in this field.
 If the virus-free Certificate uses a standard format (minimum size of a virus-free Certificate), this field is optional.
 If the size of the virus-free Certificate is above the size of the standard format (above the minimum size), this field is mandatory and defines the size of the fields comprised in the virus-free Certificate.

Virus-Free Certificate Requirements

FIG. 3 describes some of the requirements for generating and handing a virus-free Certificate request according to the present invention. The virus-free Certificate requirement table configured in the Client Workstation comprises the following fields:
 Authorized/Trusted issuers: This field (301) comprises a list of authorized and trusted issuers also called Virus-free Certificate Authorities (VCAs). The list comprises the virus-free Certificate Authorities for which the Client has already a public key. If the Client has not the public key of a virus-free Certificate Authority (VCA), the Client can authenticate this VCA directly or thanks to another Certificate Authority (CA). The list of authorized and trusted issuers can be automatically updated when a VCA is authenticated by a method or another (for instance when a CA or VCA validates another VCA).

Authorized anti-virus programs: This field (302) comprises a list of authorized anti-virus checkers also called anti-virus programs. A subfield comprises the minimum anti-virus program level accepted by the Client. The anti-virus programs level may be manually or automatically updated by the anti-virus programs themselves. Files having a virus-free Certificates below the requested level are downloaded but need to request an virus-free Certificate update.

File types requiring anti-virus Certificates: This field (303) defines the different types of files requiring a virus-free Certificates. For instance exe files, dll files or other executable files . . .

Virus-free Certificate types: This field (304) defines a virus-free Certificate type. A virus-free Certificate can be external to the associated file or integrated within this file. In both cases, A virus-free Certificate template can be defined for enabling a network device such as a firewall (between File server and Client Workstation) to add dynamically the most appropriate virus-free Certificate for such file.

Virus-free Certificate Proxy This field (305) defines a VCA Proxy that will act as relay for adding a virus-free Certificate to a file. The VCA Proxy drives all VCAs. This field is optional as can be used only if a virus-free Certificate Proxy is defined and available.

Default VCA: This field (306) defines a default VCA for the Client. Generally, the default VCA is the closest VCA in the Client's enterprise or may be a public VCA. The Client may request a virus-free Certificate for a file directly on this default VCA. This field is optional if a VCA Proxy is defined because a VCA Proxy can deal with VCAs whenever needed.

Download Actions: This field (307) describes the download actions to perform, for instance, immediate local anti-virus update/check or request for virus-free Certificate to a default VCA when no virus-free Certificate is provided.

The whole process is detailed in a flow chart in FIG. 4.

Virus-Free Certificate Template

When a File Server cannot deliver a virus-free Certificate for a file, the process, in the Client Workstation, of downloading a file and then requesting a virus-free Certificate to a Virus-free Certificate Authority, can be optimized using a virus-free Certificate template. At receipt of a virus-free Certificate request, the File Server builds a partial virus-free Certificate based on a template using the Certificate Type field (304). For example, the virus-free Certificate can include:

the list of anti-virus programs required with levels and the list of authorized/trusted issuers (VCAs).

The request can specify to send the file and the virus-free Certificate to the Client Workstation through an intermediate device such as a firewall. The intermediate device is then in charge of completing the virus-free Certificate.

The request can also specify the use of a VCA Proxy. In that case a request to the VCA Proxy is issued by the File Server indicating that the virus-free Certificate (integrated VC or external VC) has not to be sent back to the requesting File Server but directly to the Client Workstation.

The request can also specify the use of a default VCA. In this case a request to the default VCA is issued by the File Server. The default VCA sends back the requested virus-free Certificate to the requesting File Server.

Virus-Free Certificate Downloading

FIG. 4 is a flow chart of the process of downloading a file thanks a Web Browser on a Client Workstation. An equivalent flow chart can be used when the download is requested by a File transfer Protocol (FTP) Client.

(400) Before requesting the download of a file, the Client determines whether or not a virus-free Certificate is required for this file.

(404) If no virus-free Certificate is requested for the file, the Client sends a request to the File Server. Then the file is downloaded from the File Server to the Client and the process is completed.

(401) If a virus-free Certificate is requested for the file, the Client builds a virus-free Certificate request using the virus-free Certificate requirements defined in the Client file transfer application located in the Client Workstation.

(402) The File Server accepts or not the virus-free Certificate request:

(403) If the request is accepted by the File Server, the file and the associated virus-free Certificate are downloaded to the Client and the process is finished.

(412) If the request is rejected by the File Server, the Client is informed of the rejection. A window is opened on the Client's application screen, and the Client can view all the virus-free Certificates available on the File Server. The Client has the possibility to chose one of these virus-free Certificates or not.

(413) Depending on available virus-free Certificates, the Client can force the download with or without a virus-free Certificate.

If the Client decides to download the file, the file and, optionally the chosen virus-free Certificate are downloaded (404). Some download actions are activated by the Client, for instance an anti-virus checking.

(405) If the Client does not decides to download the file and if a Virus-free Authority (VCA) Proxy is defined the program continues on step 409.

(409) A request for a virus-free Certificate based on the virus-free Certificate requirements is sent by the File Server to the VCA Proxy.

(410) The VCA Proxy retrieves a virus-free Certificate for the file.

(411) The virus-free Certificate is downloaded from the Virus-free Certificate Authority (VCA) Proxy to the requesting Client. For virus-free Certificates integrated in files, the VCA Proxy downloads a file comprising the virus-free Certificate.

(406 and 407) If no VCA Proxy is defined, the file is downloaded to the Client by the File Server. The Client requests a virus-free Certificate for this file to the default VCA.

(408) The default VCA provides the virus-free Certificate. If no default VCA is defined, the Client can force or not force the download.

Advantages

The present invention provides a better and faster way for detecting viruses in files.

File Servers offer a better security for all the files they send to their clients.

The full anti-virus checking is performed once on the virus-free Certificate Authority (VCA) Server.

The Virus-free Certificate requirements are configured within the Web Browser or the file transfer protocol (FTP) client located in the Client Workstation.

Templates may be used to speed up the virus-free Certificate generation and download.

High security is provided to Clients because files are identified and certified before to be downloaded.

The present invention is
  for users, in line with current security strategies based on Certificate Authority and Certificates, and
  for files, an extension that can be easily deployed.

While the invention has been particularly shown and described with reference to a preferred embodiment, it will be understood that various changes in form and detail may be made therein without departing from the spirit, and scope of the invention.

The invention claimed is:

1. A method, for use in a client system, for downloading from a file server a file and an associated virus-free certificate certifying that the file is virus-free, comprising the steps of:
    sending a request to a file server for a virus-free certificate associated with a file to download from said file server, said request comprising one or a plurality of requirements for said virus-free certificate;
    determining whether a virus-free certificate satisfies said virus-free certificate requirements; and if no certificate satisfies the virus-free certificate requirements:
      receiving from the file server a list of available virus-free certificates, if a certificate is accepted by the client system;
      selecting from the list an available virus-free certificate for the file, and
      downloading the file and the selected virus-free certificate; otherwise,
    downloading the file and the associated virus-free certificate, said virus-free certificate comprising a file signature for certifying that the file is declared virus-free by a virus-free certificate authority.

2. The method according to claim 1 wherein the one or plurality of virus-free certificate requirements comprise:
    a list of one or a plurality of anti-virus programs that must have been executed on the file to download.

3. The method according to claim 1 wherein the one or plurality of anti-virus requirements further comprise:
    a list of one of a plurality of virus-free certificate authorities to which the issuer of the virus-free certificate must belong.

4. The method according to claim 1 wherein the one or plurality of anti-virus requirements further comprise:
    a virus-free certificate type; and
    a virus-free certificate proxy that can be used by the file server for requesting a virus-free certificate when no virus-free certificate is locally available.

5. The method according to claim 1 comprising the further steps of:
    if no certificate is accepted by the client system and if the virus-free certificate request does not comprise a virus-free certificate authority proxy:
      downloading the file without virus-free certificate; and
      requesting a virus-free certificate to a default virus-free certificate authority.

6. The method according to claim 2 wherein the one or plurality of anti-virus requirements further comprise:
    a list of one of a plurality of virus-free certificate authorities to which the issuer of the virus-free certificate must belong.

7. The method according to claim 6 wherein the one or plurality of anti-virus requirements further comprise:
    a virus-free certificate type; and
    a virus-free certificate proxy that can be used by the file server for requesting a virus-free certificate when no virus-free certificate is locally available.

8. The method according to claim 7 comprising the further steps of:
    if no certificate is accepted by the client system and if the virus-free certificate request does not comprise a virus-free certificate authority proxy:
      downloading the file without virus-free certificate; and
      requesting a virus-free certificate to a default virus-free certificate authority.

9. A client system, for carrying out the method according to claim 1.

10. A method, for use in a file server, for downloading to client system a file and an associated virus-free certificate certifying that the file is virus-free, comprising the steps of:
    receiving a request from a client system for a virus-free certificate associated with a file to download to said client system, said request comprising one or a plurality of requirements for said virus-free certificate;
    determining whether a virus-free certificate is requested for the file; and if no virus-free certificate is requested for the file
    downloading the file without associated virus-free certificate; otherwise
    downloading the file and the associated virus-free certificate, said virus-free certificate comprising a file signature for certifying that the file is declared virus-free by a virus-free certificate authority.

11. The method according to claim 10 wherein the step of determining whether said virus-free certificate is requested for the file comprises:
    determining whether a virus-free certificate for the file satisfies the virus-free certificate requirements comprised in the request; and
    if a virus-free certificate for the file satisfies the virus-free certificate requirements comprised in the request:
      downloading the file and the associated virus-free certificate.

12. The method according to claim 10 wherein the step of determining whether said virus-free certificate is requested for the file comprises:
    determining whether a virus-free certificate for the file satisfies the virus-free certificate requirements comprised in the request; and
    if no virus-free certificate for the file satisfies the virus-free certificate requirements comprised in the request:
      sending a list of available virus-free certificates for this file.

13. The method according to claim 12 wherein the step of sending a list of available virus-free certificates for this file comprises the further steps of:
    receiving a reply from the client system indicating whether an available virus-free certificate is accepted or not;

If an available virus-free certificate is accepted by the client system:
   downloading the file and the accepted virus-free certificate;
If no virus-free certificate is accepted by the client system:
   determining whether a virus-free certificate authority proxy is defined in the virus-free certificate request; and
If a virus-free certificate authority proxy is defined in the virus-free certificate request:
   requesting to this virus-free certificate authority proxy a virus-free certificate for the file.

14. The method according to claim 10 wherein the one or plurality of virus-free certificate requirements comprise:
   a list of one or a plurality of anti-virus programs that must have been executed on the file to download.

15. The method according to claim 10 wherein the one or plurality of anti-virus requirements further comprise:
   a list of one of a plurality of virus-free certificate authorities to which the issuer of the virus-free certificate must belong.

16. The method according to claim 10 wherein the one or plurality of anti-virus requirements further comprise:
   a virus-free certificate type; and
   a virus-free certificate proxy that can be used by the file server for requesting a virus-free certificate when no virus-free certificate is locally available.

17. The method according to claim 11 wherein the step of receiving a request from a client system for a virus-free certificate associated with a file to download to said client system, comprises the further steps of:
   determining whether a virus-free certificate for the file satisfies the virus-free certificate requirements comprised in the request; and
If no virus-free certificate for the file satisfies the virus-free certificate requirements comprised in the request:
   sending a list of available virus-free certificates for this file.

18. The method according to claim 17 wherein the step of sending a list of available virus-free certificates for this file comprises the further steps of:
   receiving a reply from the client system indicating whether an available virus-free certificate is accepted or not;
If an available virus-free certificate is accepted by the client system:
   downloading the file and the accepted virus-free certificate;
If no virus-free certificate is accepted by the client system:
   determining whether a virus-free certificate authority proxy is defined in the virus-free certificate request; and
If a virus-free certificate authority proxy is defined in the virus-free certificate request:
   requesting to this virus-free certificate authority proxy a virus-free certificate for the file.

19. The method according to claim 18 wherein the one or plurality of virus-free certificate requirements comprise:
   a list of one or a plurality of anti-virus programs that must have been executed on the file to download.

20. The method according to claim 19 wherein the one or plurality of anti-virus requirements further comprise:
   a list of one of a plurality of virus-free certificate authorities to which the issuer of the virus-free certificate must belong.

21. The method according to claim 20 wherein the one or plurality of anti-virus requirements further comprise:
   a virus-free certificate type; and
   a virus-free certificate proxy that can be used by the file server for requesting a virus-free certificate when no virus-free certificate is locally available.

22. A system, more particularly a file server system, for carrying out the method according to claim 10.

23. A client system for carrying out the method according to claim 8.

24. A file server system for carrying out the method according to claim 21.

25. A computer program product for downloading from a file server a file and an associated virus-free certificate certifying that the file is virus-free, said computer program product comprising a computer usable medium having computer readable program code thereon, said computer readable program code comprising of steps:
   computer readable program code means for sending a request to a file server for a virus-free certificate associated with a file to download from said file server, said request comprising one or a plurality of requirements for said virus-free certificate;
   computer readable program code for determining whether a virus-free certificate satisfies said virus-free certificate requirements and receiving from the file server a list of available virus-free certificates if no certificate satisfies the virus-free certificate requirements;
   computer readable program code means for selecting from the list an available virus-free certificate for the file and downloading the file and the selected virus-free certificate, if a certificate is accepted by the client system; and
   computer readable program code means for downloading the file and the associated virus-free certificate, said virus-free certificate comprising a file signature for certifying that the file is declared virus-free by a virus-free certificate authority.

26. A computer program product according to claim 25 wherein the one or plurality of virus-free certificate requirements comprise a list of one or a plurality of anti-virus programs that must have been executed on the file to download.

27. A computer program product for downloading files as in claim 25 wherein the one or plurality of anti-virus requirements further comprise a list of one of a plurality of virus-free certificate authorities to which the issuer of the virus-free certificate must belong.

28. A computer program product for downloading files as in claim 25 wherein the one or plurality of anti-virus requirements further comprise:
   a virus-free certificate type; and
   a virus-free certificate proxy that can be used by the file server for requesting a virus-free certificate when no virus-free certificate is locally available.

29. A computer program product as in claim 25 further comprising:
   computer readable program code means for downloading the file without virus-free certificate and requesting a virus-free certificate to a default virus-free certificate authority, if no certificate is accepted by the client system and if the virus-free certificate request does not comprise a virus-free certificate authority proxy.

30. A computer program product for downloading from a file server a file and an associated virus-free certificate certifying that the file is virus-free, said computer program product comprising a computer usable medium having computer readable program code thereon, said computer readable program code comprising:

computer readable program code means for receiving a request from a client system for a virus-free certificate associated with a file to download to said client system, said request comprising one or a plurality of requirements for said virus-free certificate;

computer readable program code means for determining whether a virus-free certificate is requested for the file and for downloading the file without associated virus-free certificate if no virus-free certificate is requested for the file; and     computer readable program code means for downloading the file and the associated virus-free certificate, said virus-free certificate comprising a file signature for certifying that the file is declared virus-free by a virus-free certificate authority.

31. A computer program product as in claim 30 wherein the computer readable program code means for receiving a request from a client system for a virus-free certificate associated with a file to download to said client system, further comprises:

computer readable program code means for determining whether a virus-free certificate for the file satisfies the virus-free certificate requirements comprised in the request; and     computer readable program code means for downloading the file and the associated virus-free certificate if a virus-free certificate for the file satisfies the virus-free certificate requirements comprised in the request.

32. A computer program product as in claim 30 wherein the computer readable program code means for receiving a request from a client system for a virus-free certificate associated with a file to download to said client system, further comprises:

computer readable program code means for determining whether a virus-free certificate for the file satisfies the virus-free certificate requirements comprised in the request; and,     computer readable program code means for sending a list of available virus-free certificates for this file if no virus-free certificate for the file satisfies the virus-free certificate requirements comprised in the request.

33. A computer program product as in claim 30 wherein computer readable program code means for sending a list of available virus-free certificates for this file further comprises:

computer readable program code means for receiving a reply from the client system indicating whether an available virus-free certificate is accepted or not;

computer readable program code means for downloading the file and the accepted virus-free certificate if an available virus-free certificate is accepted by the client system;

computer readable program code means for determining whether a virus-free certificate authority proxy is defined in the virus-free certificate request if no virus-free certificate is accepted by the client system; and     computer readable program code means for requesting to this virus-free certificate authority proxy a virus-free certificate for the file if a virus-free certificate authority proxy is defined in the virus-free certificate request.

34. A computer program product as in claim 30 wherein the one or plurality of virus-free certificate requirements comprise a list of one or a plurality of anti-virus programs that must have been executed on the file to download.

35. A computer program product as in claim 30 wherein the one or plurality of anti-virus requirements further comprise a list of one of a plurality of virus-free certificate authorities to which the issuer of the virus-free certificate must belong.

36. The computer program product as in claim 30 wherein the one or plurality of anti-virus requirements further comprise:

a virus-free certificate type; and a virus-free certificate proxy that can be used by the file server for requesting a virus-free certificate when no virus-free certificate is locally available.

\* \* \* \* \*